(12) United States Patent
Nakai et al.

(10) Patent No.: US 8,004,753 B2
(45) Date of Patent: Aug. 23, 2011

(54) OPTICAL AMPLIFIER, FIBER LASER, AND METHOD OF ELIMINATING REFLECTED LIGHT

(75) Inventors: Michihiro Nakai, Sakura (JP); Tetsuya Sakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/647,046

(22) Filed: Dec. 24, 2009

(65) Prior Publication Data

US 2010/0097689 A1 Apr. 22, 2010

Related U.S. Application Data

(63) Continuation of application No. PCT/JP2007/063138, filed on Jun. 29, 2007.

(51) Int. Cl.
*H01S 3/00* (2006.01)
(52) U.S. Cl. .................. 359/337.2; 359/337; 359/337.4
(58) Field of Classification Search ............... 359/337.2, 359/337, 337.4
See application file for complete search history.

(56) References Cited

U.S. PATENT DOCUMENTS

| | | | |
|---|---|---|---|
| 5,745,284 A | 4/1998 | Goldberg et al. | |
| 5,864,644 A | 1/1999 | DiGiovanni et al. | |
| 5,880,877 A | 3/1999 | Fermann et al. | |
| 6,014,249 A | 1/2000 | Fermann et al. | |
| 6,340,806 B1* | 1/2002 | Smart et al. | 219/121.62 |
| 6,972,894 B2 | 12/2005 | Bjarklev et al. | |
| 7,420,994 B2* | 9/2008 | Korolev et al. | 372/3 |
| 2002/0054733 A1 | 5/2002 | Kagi et al. | |
| 2003/0234973 A1 | 12/2003 | Yamaguchi et al. | |
| 2005/0190802 A1 | 9/2005 | Richardson et al. | |
| 2010/0085632 A1* | 4/2010 | Henderson | 359/341.3 |
| 2010/0135340 A1* | 6/2010 | Kitabayashi | 372/6 |

FOREIGN PATENT DOCUMENTS

| | | |
|---|---|---|
| EP | 1 353 460 A1 | 10/2003 |
| JP | 03-242627 A | 10/1991 |
| JP | 2619096 B2 | 3/1997 |
| JP | 2619096 B2 | 6/1997 |
| JP | 10-213827 A | 8/1998 |
| JP | 2002-006348 A | 1/2002 |
| JP | 2002-296630 A | 10/2002 |
| JP | 2003-035919 A | 2/2003 |
| JP | 2003-143081 A | 5/2003 |
| JP | 2003-298527 A | 10/2003 |
| JP | 2004-227011 A | 8/2004 |
| JP | 2005-102107 A | 4/2005 |

(Continued)

OTHER PUBLICATIONS

International Search Report of PCT/JP2007/063138, mailing date of Jul. 31, 2007.

(Continued)

*Primary Examiner* — Mark Hellner
(74) *Attorney, Agent, or Firm* — Westerman, Hattori, Daniels & Adrian, LLP (57) ABSTRACT

A MO-PA type optical amplifier is provided which includes an oscillator and an amplifier including a fiber for optical amplification, including: a reflected-light wavelength conversion fiber which is provided on an optical path between the oscillator and the amplifier and which converts a wavelength of reflected-light traveling toward the oscillator due to Stimulated Raman Scattering; and a filter which is provided on the optical path between the oscillator and the amplifier and which eliminates the wavelength-converted light.

16 Claims, 4 Drawing Sheets

FOREIGN PATENT DOCUMENTS

| | | |
|---|---|---|
| JP | 2007-42981 A | 2/2007 |
| JP | 2007-114335 A | 5/2007 |
| JP | 2007-221037 A | 8/2007 |

OTHER PUBLICATIONS

Nakai, Michihiro et al.; "30W Q-SW fiber Laser"; Proceedings of SPIE, Fiber Lasers IV: Technology, Systems, and Applications, vol. 6453, Feb. 22, 2007.

Bouwmans, G. et al.,; "Fabrication and characterization of an all-solid 2D photonic bandgap fiber with a low-loss region (<20dB/km) around 1550 nm"; Optics Express, vol. 13, No. 21, 2005; pp. 8452-8459.

International Search Report of PCT/JP2008/061534, mailing date Jul. 29, 2008.

Written Opinion of the International Searching Authority, issued in International Application No. PCT/JP2008/061534 on Jul. 29, 2008.

Written Opinion of the International Searching Authority, issued in corresponding International Application No. PCT/JP2007/063138 on Jul. 31, 2007.

Russian Office Action dated Mar. 4, 2011, issued in corresponding Russian Patent Application No. 2010102046.

* cited by examiner

OPTICAL AMPLIFIER, FIBER LASER, AND METHOD OF ELIMINATING REFLECTED LIGHT

This is a Continuation Application of International Application No. PCT/JP2007/063138, filed on Jun. 29, 2007. The content of the aforementioned application is incorporated herein by reference.

BACKGROUND OF THE INVENTION

1. Field of the Invention

The present invention relates to a MO-PA (Master Oscillator-Power Amp or Oscillator+Amplifier) type optical amplifier or laser in which an oscillator and an amplifier having a fiber for optical amplification are combined. More specifically, it relates to an optical amplifier that can prevent damage or breakage of an oscillator caused by reflected-light, a fiber laser using the same, and a method of eliminating reflected-light in a MO-PA type optical amplifier.

2. Description of the Related Art

Recently, attention has been drawn to fiber lasers which are used as a light source for diagnosis, measurement, remedy, fabrication and the like. Among other fiber lasers, a pulse laser is widely used as a light source for fabrication and a light source for measurement.

When a laser for pulse oscillation is formed by a fiber laser, there are many cases in which they are structured in a MO-PA type. The MO-PA type lasers have the advantage that since in each laser an oscillator and an amplifier can be separately formed from each other, the oscillator can be formed by a number of optical components for low power and the amplifier can be formed by a small number of optical components for high power. Namely, such a use of different components for different purposes is advantageous since the costs of optical components for high power are generally higher than those of optical components for low power. Another advantage of the MO-PA type is that an amplifier in which the insertion loss of optical components has a significant effect on an optical gain is formed separately from an oscillator in which high-loss optical components must be used, and whereby a high-output power in totality can effectively be obtained.

However, such a MO-PA type high-power optical amplifier and a MO-PA type fiber laser have a drawback in that they are weak or vulnerable to reflected-light. When reflected-light which has returned to the optical amplifier or fiber laser and which may be weak is passed in a reverse direction through a PA section (amplifying section) inside an apparatus, it is amplified or receives a large power amplification, and therefore, there is a concern that a MO section would be destroyed due to this kind of large power. Conventionally, as a means to reduce such power, an optical isolator is used in some cases. However, it is necessary for an optical isolator to have a power-resistant characteristic when it is used in a laser. Consequently, the optical isolator is generally large-sized and high-priced, resulting in an increase in optical loss. Incidentally, although the inventors considered a method of minimizing the effects of reflected-light by the use of a control circuit or the like, the control became complicated and it was difficult to control reflection under all circumstances.

SUMMARY OF THE INVENTION

Consequently, an object of the present invention is to provide an optical amplifier that can prevent damage or breakage of an oscillator caused by reflected-light, a fiber laser using the former, and a method of eliminating reflected-light in a MO-PA type optical amplifier or laser.

In order to achieve the above object, according to a first aspect of the present invention, a MO-PA type optical amplifier or laser is provided which includes an oscillator and an amplifier including a fiber for optical amplification, having: a reflected-light wavelength conversion fiber which is provided on an optical path between the oscillator and the amplifier and which converts a wavelength of reflected-light traveling toward the oscillator due to Stimulated Raman Scattering; and a filter which is provided on the optical path between the oscillator and the amplifier and which eliminates the wavelength-converted light.

A second aspect of the present invention is such that, in the first aspect, the filter includes one, or two or more selected from a group of a fiber grating, an optical fiber coupler, a dielectric multi-layer filter, and an etalon filter.

A third aspect of the present invention is such that, according to the first aspect, the filter includes: a filter that utilizes bending loss of a fiber; and/or a filter that utilizes wavelength-dependent loss of a waveguide due to the addition of impurities to a fiber.

A fourth aspect of the present invention is such that, according to any one of the first aspect to the third aspect, the length of and the core diameter of the reflected-light wavelength conversion fiber are controlled such that wavelength-conversion is carried out when a power of light propagated therethrough exceeds the peak value of the inputted light and that wavelength-conversion is not carried out when light propagated therethrough does not exceed the peak value of inputted light to the amplifier.

A fifth aspect of the present invention is a fiber laser including the optical amplifier according to any one of the first aspect to the fourth aspect.

According to a sixth aspect of the present invention, a method of eliminating reflected light is provided in a MO-PA type optical amplifier or laser which includes an oscillator and an amplifier including a fiber for optical amplification, to prevent damage of the oscillator caused by the reflected-light, the method including: guiding into a reflected-light wavelength conversion fiber reflected-light which travels toward the oscillator and has a high peak value, and thereat converting the reflected-light by virtue of Stimulated Raman Scattering; and eliminating the thus-wavelength-converted light by the use of a filter.

A seventh aspect of the present invention is such that, according to the sixth aspect, the filter includes one, or two or more selected from the group consisting of a fiber grating, an optical fiber coupler, a dielectric multi-layer filter, and an etalon filter.

An eighth aspect of the present invention is such that, according to the sixth aspect or the seventh aspect, the length of and the core diameter of the reflected-light wavelength conversion fiber are controlled such that wavelength-conversion is carried out when a power of light propagated therethrough exceeds the peak value of the inputted light and that wavelength-conversion is not carried out when light propagated therethrough does not exceed the peak value of inputted light to the amplifier.

According to the present invention, reflected-light propagated to the oscillator and having a high peak value is guided into the reflected-light wavelength conversion fiber, where it is wavelength-converted by Stimulated Raman Scattering, and thereafter, the thus-wavelength-converted light is eliminated by the filter whereby breakage of the oscillator caused by the reflected-light can be prevented.

Further, light outputted from the optical amplifier is not subject to a special treatment. In other words, the countermeasure against reflected-light does not have any adverse effect on an oscillation wavelength, a pulse width and the like. Therefore, the conventional optical amplifier does not become damaged in terms of the function and performance thereof. Consequently, the system design can be made as reliable as that of the conventional.

Further, as to the reflected-light, with no modification of a control circuit, it is possible to selectively eliminate hazardous and high-energy (high-power) pulse light only by virtue of an optical circuit. Furthermore, the wavelength-conversion necessitates no control means and theoretically occurs with one-hundred percent probability so long as the requirements are met. Therefore, there is no error caused by the control.

Moreover, with regard to the number of parts, it is only necessary to add several meters of conventional fiber and a long-wavelength-cut filter. Thus, there is almost no increase in the cost. A power-resistant optical isolator available in an output system costs, for example, five hundred thousand yen, whereas even the total costs of such an optical fiber and a filter are estimated at ten thousand yen at the highest. The difference between them is clear.

These optical parts are low-loss components by nature. They are long-lived and exhibit low loss since they are disposed before the PA section. For example, as compared to a structure in which an optical isolator is disposed in an output section, the optical output loss is one-fiftieth or less (the optical isolator induces 10 percent or more loss whereas the present inventive structure induces 0.2 percent or less loss), and the life is ten times longer (the life of the optical isolator is of the order of fifty thousand hours whereas the life of each part used in the present inventive structure is five hundred thousand hours or more).

As a secondary benefit of the present invention, light with a certain wavelength which is contained in the outputted light from the MO section and which is seed or germ light of Stimulated Raman Scattering induced in the PA section is successfully eliminated by the filter of the present invention, and therefore, Stimulated Raman Scattering cannot easily be induced in an optical path from the PA section to a portion on which a light beam is irradiated. Although the fiber length of a conventional laser output section is limited to the range in which Stimulated Raman Scattering is not generated, such a limitation is substantially reduced in the present invention.

In the present invention, since the fiber laser is provided with the optical amplifier according to the present invention, the effects similar to those of the optical amplifier can be obtained.

In the method of eliminating reflected light according to the present invention, with the simple and easy improvement or with the aid of the reflected-light wavelength conversion fiber and the filter which are added to the conventional optical amplifier and fiber laser, it is possible to effectively prevent damage of the oscillator due to the reflected light.

DETAILED DESCRIPTION OF THE INVENTION

In a MO-PA (Master Oscillator-Power Amplifier) type optical amplifier and/or a fiber laser, a workpiece is irradiated with outputted light that has been amplified in a PA (Power Amplifier) section. At this time, light which has been incident upon and reflected off of the workpiece returns to the inside of the laser. If the reflected light has the same wavelength as the outputted light (or oscillated light) has, it is difficult to effectively eliminate only the reflected light. Such a reflected light problem is resolved by a method of the present invention or an idea such that only the reflected light is wavelength-converted.

With reference to the drawings, several embodiments of the present invention will now be described.

Figure 1:
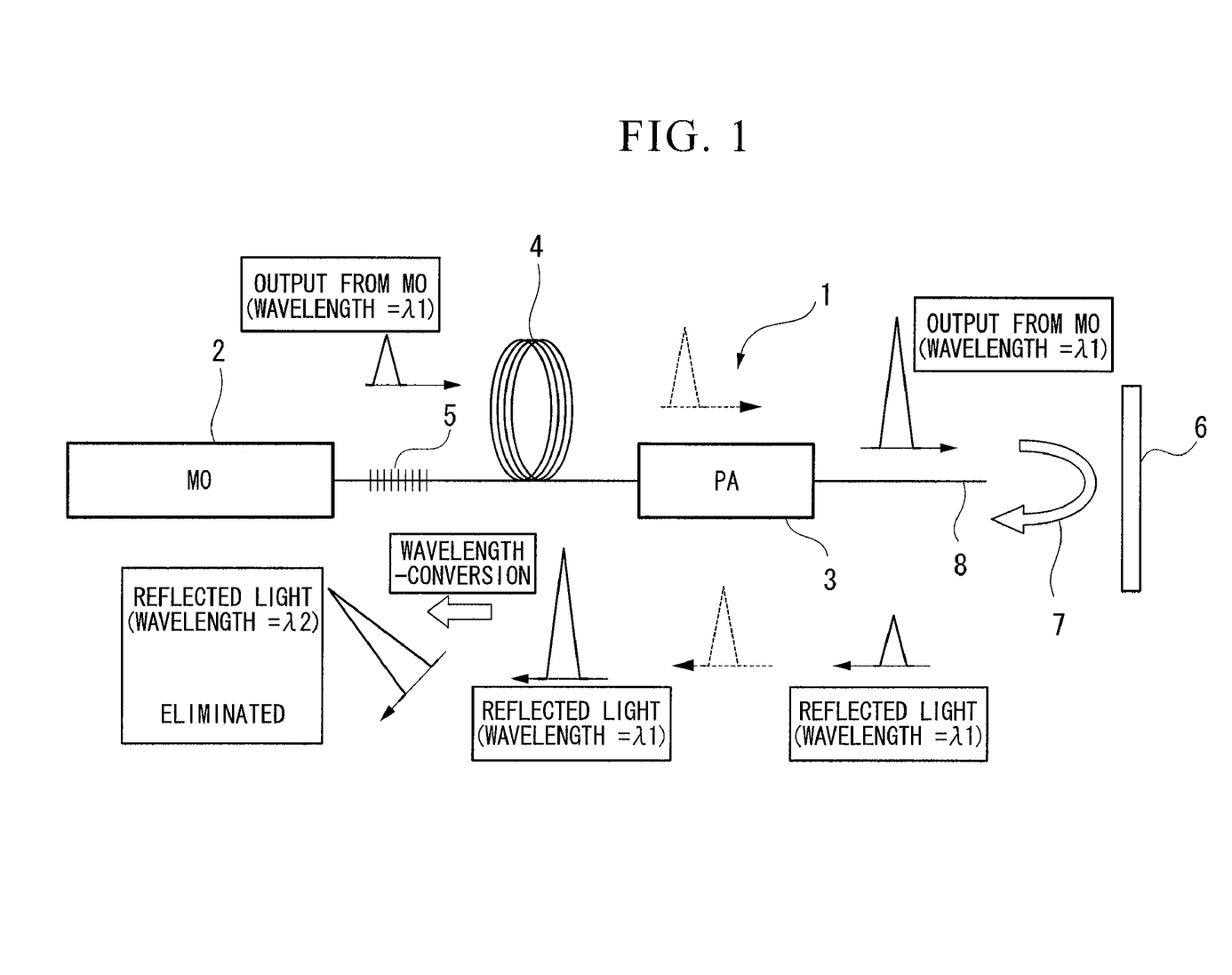
FIG. 1 is a general structural view illustrating a fiber laser according to an embodiment of the present invention.

FIG. 1 is a view illustrating a general structure of a fiber laser 1 of MO-PA type (an embodiment of a fiber laser and an optical amplifier) according to the present invention.

The fiber laser 1 of the present embodiment includes a MO (Master Oscillator) section 2 which is an oscillator, a PA (Power Amplifier) section 3 which is an amplifier, a reflected-light wavelength conversion fiber 4 which is disposed at the PA section 3 side and converts wavelengths of reflected light traveling toward the oscillator by the effect of Stimulated Raman Scattering (SRS), and a filter 5 which is disposed at the MO section 2 side and eliminates the wavelength-converted light.

A method of converting a wavelength of only reflected light according to the present invention includes, as illustrated in FIG. 1, disposing the reflected-light wavelength conversion fiber 4, an effective cross-sectional area of a core of which is set at an appropriate value, between the MO section 2 and the PA section 3 within the fiber laser 1, and then, wavelength-converting only lights each having a large peak power, of reflected light.

Figure 2:
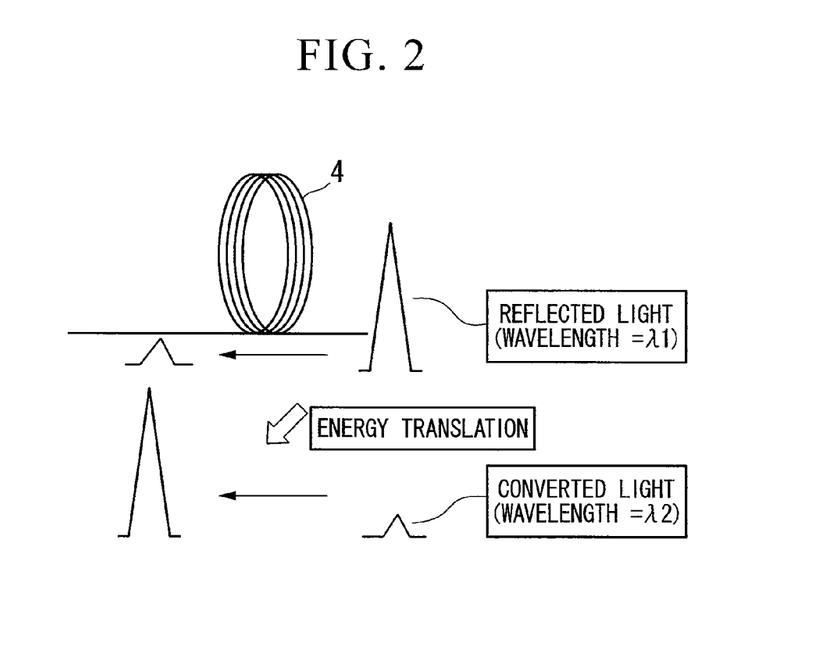
FIG. 2 is a schematic view illustrating the course of a wavelength conversion of reflected light in a reflected-light wavelength conversion fiber according to the embodiment of the present invention.

FIG. 2 schematically illustrates an outline of the wavelength conversion. In the present embodiment, since wavelength conversion of reflected light is carried out by the use of Stimulated Raman Scattering, it is reliably converted to light having a long wavelength. When being converted, wavelengths variously change depending on the original wavelengths, materials, or the like. For example, in the case of a silica-based glass fiber, light having a wavelength of 1.06 μm is converted to light having a wavelength of 1.11 μm to 1.13 μm due to Stimulated Raman Scattering.

The structure is such that the filter 5 to eliminate the thus-wavelength-converted light is disposed at the MO section side between the MO section and the PA section. On the other hand, when the outputted light from the MO section has passed through the filter 5, the peak power thereof is small and there is no influence from the wavelength-conversion due to the Stimulated Raman Scattering.

Figure 3:
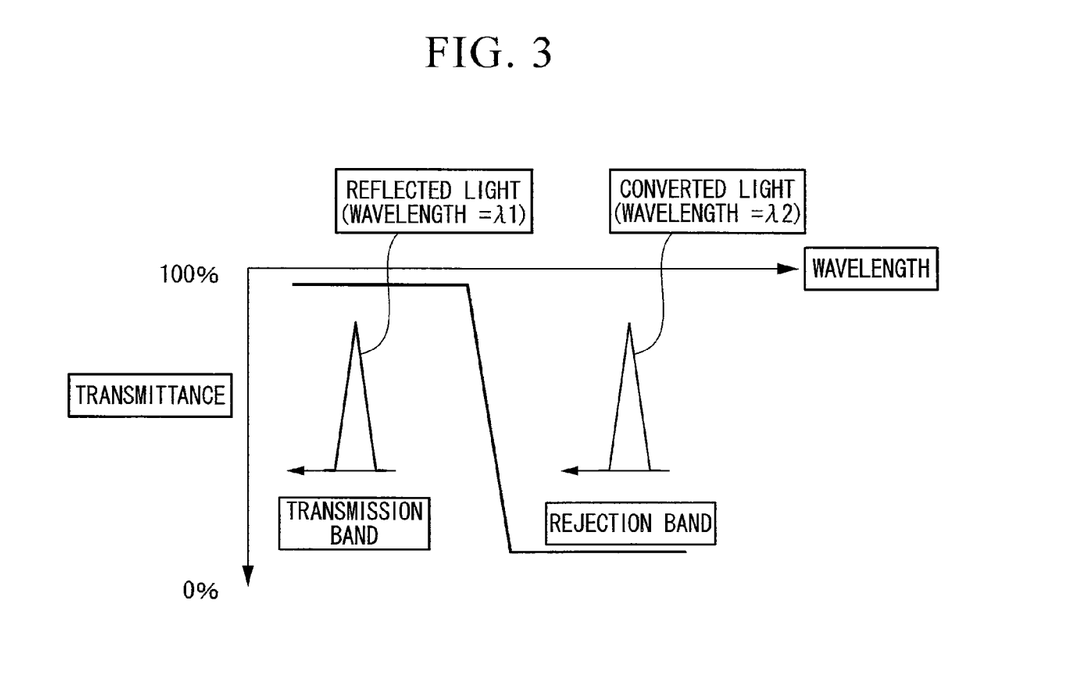
FIG. 3 is a schematic view illustrating the characteristics of a filter according to the embodiment of the present invention.

FIG. 3 diagrammatically illustrates the characteristics of transmission of the filter 5. The returning reflected light passes through the PA section 3 whereby it obtains enough power to destroy the MO section 2. This powerful reflected light is wavelength-converted in the reflected-light wavelength conversion fiber 4, and thereafter, the thus wavelength-converted light is eliminated by means of the filter 5. Generally, reflected light and wavelength-converted light are different by 0.02 μm or more. Thus, such eliminations or separations can easily be made by using low-priced filter elements.

As examples of the filter 5, fiber gratings (FBG) and WDM (optical fiber) couplers can be used. Dielectric multi-layer filters and Etalon Filters can also be used. Alternatively, a fiber with a filter function added thereto by bending and a fiber with a filter function added thereto by doping impurities can be used.

In the fiber laser 1 of the present embodiment, oscillated light outputted from the MO section 2 is not influenced by the filter 5 since it has wavelengths which are different therefrom. Further, the oscillated light is not wavelength-converted by the reflected-light wavelength conversion fiber 4 since the power thereof is small. Such oscillated light as has no influence from the filter 5 and is not wavelength-converted is inputted to the PA section 3 where it is amplified, and then, discharged outside of the laser.

Incidentally, of returning reflected light when it has passed through the PA section 3, reflected light which has small peak power is not wavelength-converted in the reflected-light wavelength conversion fiber 4, namely wavelengths thereof are not changed. As such, it is passed through the filter 5 without having been eliminated thereby, and then, inputted to the MO section 2. The thus-inputted light does not even destroy the MO section 2 because of the smallness of the power thereof. In effect, there is no practical problem.

In the fiber laser 1 according to the present embodiment, the reflected-light wavelength conversion fiber 4 which wavelength-converts reflected light propagated toward the MO section by virtue of Stimulated Raman Scattering (SRS) and the filter 5 which eliminates the thus-wavelength-converted light are provided between the MO section 2 and the PA section 3. The reflected light propagated toward the MO section 2 and having the high peak value (peak power) is wavelength-converted by the reflected-light wavelength conversion fiber 4 and the thus-wavelength-converted light is eliminated by the filter 5. As a result, the possibility of breakage or damage of the MO section 2 due to the reflected light can be effectively reduced or prevented.

Further, in terms of oscillated wavelengths and pulse widths and the like, light emitted or discharged from the laser has no negative influence from the anti-reflection measures implemented. Accordingly, from the point of view of the characteristic of emitted light, it is as easy to deal or handle with the present inventive fiber laser as conventional fiber lasers.

Furthermore, in terms of reflected light, it is possible to remove or eliminate only hazardous, high-energized pulse lights without making any changes to an associated electrical control circuit and only with such a simple optical-circuit structure as described. Moreover, theoretically speaking, if the conditions are met, wavelength-conversions arise at a rate of one hundred percent (100%), and thus, there are no errors caused by the controls.

Yet further, in terms of the number of parts or elements, only addition of an ordinary optical fiber of several meters in length and of a filter for long wavelength are sufficient for the purpose, and as a result, the increase in cost is minimal.

Still further, light wavelength-converted by Stimulated Raman Scattering is eliminated from the outputted light from the MO section 2, and therefore, Stimulated Raman Scattering cannot easily be induced in the laser output section (or in the optical path from the PA section 3 to a portion on which a light beam is emitted or irradiated). Although the fiber length of a conventional laser output section is limited to the range in which Stimulated Raman Scattering is not generated, such a limitation can be substantially relieved or widened in the present invention.

The method of eliminating reflected right according to the present invention is characterized in that, in the fiber laser 1 structured as illustrated in, for example, FIG. 1, reflected-light which is propagated toward the oscillator and having a high peak value is guided into a reflected-light wavelength conversion fiber 4, that the reflected-light is wavelength-converted by virtue of Stimulated Raman Scattering, and that the thus-wavelength-converted light is eliminated by the filter 5.

As illustrated in FIG. 1, when a laser beam discharged from an end of an output fiber 8 of the fiber laser 1 and having peak power is incident upon a workpiece 6, a small fraction of the incident light is reflected therefrom and returned through the end of the output fiber 8 into the fiber laser 1. The reflected light 7 has the same wavelength as outputted light of the fiber laser 1 and is propagated in the reverse direction while being amplified in the PA section 3. The reflected light 7 returning from the PA section 3 toward the MO section 2 is passed through the reflected-light wavelength conversion fiber 4 where it is wavelength-converted by Stimulated Raman Scattering. The thus-wavelength-converted light, which has a long wavelength, is eliminated by being optically reflected, split, or absorbed, and is not incident upon the MO section.

In this way, according to the reflected-light removing method of the present invention, with the simple structure in which the reflected-light wavelength conversion fiber 4 and the filter 5 are provided in addition to the conventional optical amplifier and the conventional fiber laser, it is possible to effectively prevent damage or breakage of the oscillator caused by the reflected light.

Further, according to the method of the present invention, the following secondary effect can be expected. The long-wavelength-cut filter (or short pass filter) 5 is provided directly downstream of the MO section 2 whereby a long-wavelength component is eliminated from components of light outputted from the MO section 2. Usually, even oscillated laser light contains a fragment of spontaneous emitted light at around oscillation wavelength. Long-wavelength components of the spontaneous emitted light induce Stimulated Raman Scattering when the laser beam is amplified in the PA section 3. In the conventional laser, due to the thus-induced Stimulated Raman Scattering, a greater limitation is imposed upon the fiber length or the distance from the portion where amplification is carried out in the PA section 3 to the portion where the beam is emitted to the outside of the laser. On the other hand, in the present invention, long-wavelength components of spontaneous emitted lights are substantially reduced by the filter 5, and therefore, Stimulated Raman Scattering cannot easily be induced. As a result, the limitation with respect to the distance to the portion to emit light to outside of the laser (or the fiber length) can be greatly reduced.

According to the present invention, any amplifier can be used whatever wavelength it is dedicated for, so long as it is high-powered. Especially, the present invention is applicable to an amplifier such as a fiber laser, which outputs high pulses. In recent years, peak values of high-power amplifiers for communications have become upgraded, so that it becomes more and more useful to apply the present invention thereto.

For example, the present invention is applicable to the case in which amplification of 1550 nm is carried out by the use of an Er-doped fiber. In this case, wavelength-conversion is generated at around 1640 nm due to Stimulated Raman Scattering. It is, therefore, possible to use a filter which passes light of 1550 nm and which does not pass light of around 1640 nm.

In accordance with the present invention, reflected-light suppression in a fiber laser was verified. As an example, a fiber laser which has an oscillating wavelength of 1064 nm and has a mechanism as illustrated in FIG. 1 was used. An LD having an excitation wavelength of 976 nm was used and an optical output power for excitation was 40 W. Then, a laser output power averaged to 18 W and a peak value of pulse was 6 kW at maximum.

Between the MO section 2 and the PA section 3 of the fiber laser 1, a single-mode fiber which has a core of 5 μm and has a length of approximately 20 m was provided as the reflected-light wavelength conversion fiber 4. Between this single-mode fiber and the MO section 2, the long-wavelength-cut filter 5 which uses a fiber grating having a transmissivity of 0.1 dB at 1064 nm and having a transmissivity of 30 dB at 1110 nm to 1180 nm was provided.

In this configuration, as the reflected-light 7, light having a 0.5% (i.e., 30 W at peak value) of the laser output power was injected into the laser. In this instance, the reflected-light 7 was propagated through the PA section in a direction opposite to the usual direction. When it had passed through the PA section, the peak value thereof reached 3 kW.

The MO section 2 used in the present example uses a component part having a momentary input power capacity of 500 W as usual. Thus, if the 3 kW light is input thereinto as it is, the MO section 2 is damaged thereby. However, the measurement conducted with respect to a wavelength of the light which had passed through the reflected-light wavelength conversion fiber 4 revealed that the light was wavelength-converted up to 1120 nm±5 nm (long-wavelength side). Since 99.9% of the thus wavelength-converted light was eliminated by the filter 5, the MO section 2 was not damaged or broken.

Figure 4:
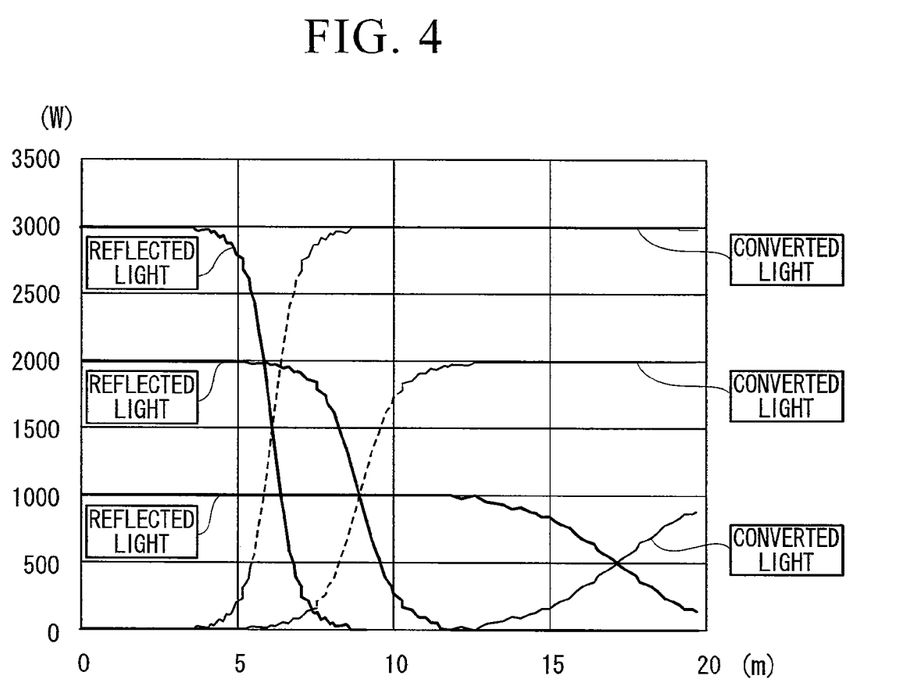
FIG. 4 is a view illustrating forms of wavelength conversion obtained by calculation.

FIG. 1 illustrates forms of wavelength conversion obtained by calculation.

In the present example, the pulse having peak power of 3 kW was wavelength-converted. From the drawing of FIG. 4, it can be recognized that, so long as the reflected-light wavelength conversion fiber 4 has a length of 8 meters or more, such wavelength conversion can easily be carried out. When the peak value is further small or 2 kW, it can be carried out so long as the fiber has a length of 11 meters or more. When the peak value is 1 kW, it can be carried out so long as the fiber has a length of 20 meters or more.

In the present example, from consideration of a relationship between optical power of the reflected-light and the power resisting property of the MO section 2, the single-mode fiber which had a core of 5 μm and was 20 meters long was used as the reflected-light wavelength conversion fiber 4. Other variations are possible. For example, when the power resisting property of the MO section 2 is low, it is preferable to make the core diameter of the reflected-light wavelength conversion fiber 4 smaller or to make the fiber length longer. If the core diameter is extremely different from those of transmission fibers connected therebefore and thereafter, splice loss occurs. Therefore, it is desirable to set the diameter within a range from 3 μm or more to 20 μm or less.

Further, the longer the reflected-light wavelength conversion fiber 4 is, the easier the wavelength-conversion of light having a low peak value becomes, and therefore, the longer fiber is preferable. However, the fiber length is preferable such that pulse light outputted from the MO section 2 is not substantially wavelength-converted. In the present example, since pulse light outputted from the MO section 2 has a peak value of 60 W or less, it is desirable that the fiber length be 100 meters or less. Even if it is within such a desirable range, when the reflected-light wavelength conversion fiber is long, light having a high peak value is several times subjected to wavelength-conversion due to Stimulated Raman Scattering, and therefore, the wavelength thereof is shifted to the longer wavelength side. If the reflected-light wavelength conversion fiber 4 is made longer, it is necessary for the reflected-light wavelength conversion fiber 4 to possess a wider reject-bandwidth. Accordingly, as described in the present example, it is desirable to determine the length of the reflected-light wavelength conversion fiber 4 in consideration of the minimum or smallest value among peak values of reflected-light to be removed or rejected.

Figure 5:
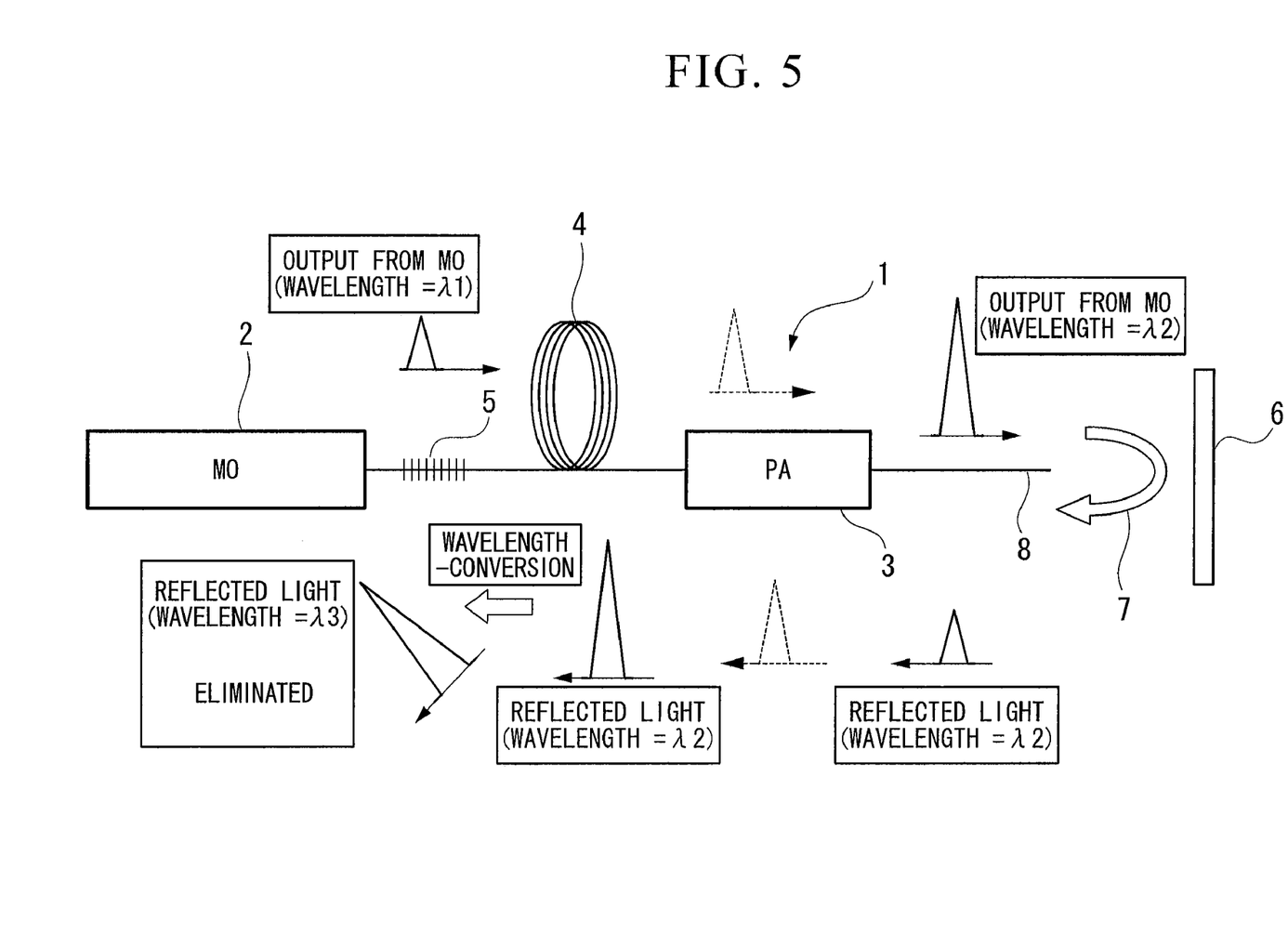
FIG. 5 is a general structural view illustrating a fiber laser according to another embodiment of the present invention.

FIG. 5 illustrates a fiber laser according to another embodiment of the present invention. This fiber laser is structured and provided with structural components similar to those of the fiber laser illustrated in FIG. 1. In the above-described embodiment, only reflected-light having higher peak values is wavelength-converted, whereas, in the present embodiment, a structure is also possible in which the fiber length is controlled so that even low-power light is wavelength-converted and in which both of light outputted from the MO section 2 and of reflected-light are wavelength-converted (see FIG. 5). In this configuration, a wavelength of the filter 5 is set to be shifted to the long wavelength side by an amount corresponding to a two-fold wavelength-conversion.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A MO-PA type optical amplifier which includes an oscillator and an amplifier including a fiber for optical amplification, comprising:
   a reflected-light wavelength conversion fiber which is provided on an optical path between the oscillator and the amplifier and which converts a wavelength of reflected-light traveling toward the oscillator due to Stimulated Raman Scattering; and
   a filter which is provided on the optical path between the oscillator and the amplifier and which eliminates the wavelength-converted light.

2. The optical amplifier according to claim 1, wherein the filter comprises one, or two or more selected from the group consisting of a fiber grating, an optical fiber coupler, a dielectric multi-layer filter, and an etalon filter.

3. The optical amplifier according to claim 1, wherein the filter at least comprises a filter selected from a filter that utilizes bending loss of a fiber, and a filter that utilizes wavelength-dependent loss of a waveguide due to the addition of impurities to a fiber.

4. The optical amplifier according to claim 1, wherein the length of and the core diameter of the reflected-light wavelength conversion fiber are controlled such that wavelength-conversion is carried out when a power of light propagated therethrough exceeds a peak value of the inputted light and that wavelength-conversion is not carried out when light propagated therethrough does not exceed a peak value of inputted light to the amplifier.

5. The optical amplifier according to claim 2, wherein the length of and the core diameter of the reflected-light wavelength conversion fiber are controlled such that wavelength-conversion is carried out when a power of light propagated therethrough exceeds a peak value of the inputted light and that wavelength-conversion is not carried out when light propagated therethrough does not exceed a peak value of inputted light to the amplifier.

6. The optical amplifier according to claim 3, wherein the length of and the core diameter of the reflected-light wavelength conversion fiber are controlled such that wavelength-conversion is carried out when a power of light propagated therethrough exceeds a peak value of the inputted light and that wavelength-conversion is not carried out when light propagated therethrough does not exceed a peak value of inputted light to the amplifier.

7. A fiber laser comprising the optical amplifier according to claim 1.

8. A fiber laser comprising the optical amplifier according to claim 2.

9. A fiber laser comprising the optical amplifier according to claim 3.

10. A fiber laser comprising the optical amplifier according to claim 4.

11. A fiber laser comprising the optical amplifier according to claim 5.

12. A fiber laser comprising the optical amplifier according to claim 6.

13. A method of eliminating reflected light in a MO-PA type optical amplifier which includes an oscillator and an amplifier including a fiber for optical amplification, to prevent damage of the oscillator caused by the reflected-light, the method comprising:

guiding into a reflected-light wavelength conversion fiber reflected-light which travels toward the oscillator and has a high peak value, and thereat converting the reflected-light by virtue of Stimulated Raman Scattering; and eliminating the thus-wavelength-converted light by the use of a filter.

14. The method of eliminating reflected light according to claim 13, wherein the filter comprises one, or two or more selected from the group consisting of a fiber grating, an optical fiber coupler, a dielectric multi-layer filter, and an etalon filter.

15. The method of eliminating reflected light according to claim 13, wherein the length of and the core diameter of the reflected-light wavelength conversion fiber are controlled such that wavelength-conversion is carried out when a power of light propagated therethrough exceeds a peak value of the inputted light and that wavelength-conversion is not carried out when light propagated therethrough does not exceed a peak value of inputted light to the amplifier.

16. The method of eliminating reflected light according to claim 14, wherein the length of and the core diameter of the reflected-light wavelength conversion fiber are controlled such that wavelength-conversion is carried out when a power of light propagated therethrough exceeds a peak value of the inputted light and that wavelength-conversion is not carried out when light propagated therethrough does not exceed a peak value of inputted light to the amplifier.

* * * * *